US011588723B2

(12) United States Patent
Jiang (10) Patent No.: US 11,588,723 B2
(45) Date of Patent: Feb. 21, 2023

(54) RETURN SOURCE RELATIONSHIP MANAGEMENT SYSTEM, METHOD, DEVICE, AND SERVER, AND STORAGE MEDIUM

(71) Applicants: Beijing Kingsoft Cloud Network Technology Co., Ltd., Beijing (CN); Beijing Kingsoft Cloud Technology Co., Ltd., Beijing (CN); Beijing Jinxun Ruibo Network Technology Co., Ltd, Beijing (CN)

(72) Inventor: Ran Jiang, Beijing (CN)

(73) Assignees: BEIJING KINGSOFT CLOUD NETWORK TECHNOLOGY CO., LTD., Beijing (CN); BEIJING KINGSOFT CLOUD TECHNOLOGY CO., LTD., Beijing (CN); BEIJING JINXUN RUIBO NETWORK TECHNOLOGY CO., LTD, Beijing (CN)

(*) Notice: Subject to any disclaimer, the term of this patent is extended or adjusted under 35 U.S.C. 154(b) by 0 days.

(21) Appl. No.: 16/962,565

(22) PCT Filed: Jan. 24, 2019

(86) PCT No.: PCT/CN2019/072937
§ 371 (c)(1),
(2) Date: Jul. 16, 2020

(87) PCT Pub. No.: WO2019/144899
PCT Pub. Date: Aug. 1, 2019

(65) Prior Publication Data
US 2020/0344149 A1 Oct. 29, 2020

(30) Foreign Application Priority Data
Jan. 26, 2018 (CN) .......................... 201810078366.9

(51) Int. Cl.
*G06F 15/173* (2006.01)
*H04L 45/02* (2022.01)
(Continued)

(52) U.S. Cl.
CPC .......... *H04L 45/02* (2013.01); *G06F 12/0802* (2013.01); *G06F 16/27* (2019.01);
(Continued)

(58) Field of Classification Search
USPC ....................................................... 709/223
See application file for complete search history.

(56) References Cited

U.S. PATENT DOCUMENTS 6,925,504 B1 * 8/2005 Liskov ................ H04L 67/1095
370/351
2008/0303568 A1 12/2008 Werner et al.
(Continued)

FOREIGN PATENT DOCUMENTS

CN 102647299 A 8/2012
CN 104011701 A 8/2014
(Continued)

OTHER PUBLICATIONS

International Search Report/Written Opinion in related/corresponding PCT Application No. PCT/CN2019/072937 dated Apr. 24, 2019.

*Primary Examiner* — Umar Cheema
*Assistant Examiner* — Tesfu N Mekonen
(74) *Attorney, Agent, or Firm* — Patent Portfolio Builders PLLC (57) ABSTRACT

The embodiment of the present disclosure provides a back-to-source relationship management system, method, apparatus, server and storage medium. The back-to-source relationship management system comprises a back-to-source relationship management server, which is configured for
(Continued)

obtaining a target domain name corresponding to a target CDN node back-to-source relationship to be adjusted and adjustment information; using the adjustment information to adjust the target CDN node back-to-source relationship to obtain the adjusted target CDN node back-to-source relationship; synchronizing the target domain name and the adjusted target CDN node back-to-source relationship to a cache management server; the cache management server is configured for receiving the target domain name and the adjusted target CDN node back-to-source relationship; using the adjusted target CDN node back-to-source relationship to update the CDN node back-to-source relationship corresponding to the target domain name and obtain a new CDN node back-to-source relationship.

19 Claims, 3 Drawing Sheets

(51) Int. Cl.
*G06F 16/27* (2019.01)
*G06F 12/0802* (2016.01)
*H04L 41/0816* (2022.01)
*H04L 41/22* (2022.01)
*H04L 67/289* (2022.01)
*H04L 61/58* (2022.01)

(52) U.S. Cl.
CPC .......... *H04L 41/0816* (2013.01); *H04L 41/22* (2013.01); *H04L 61/58* (2022.05); *H04L 67/289* (2013.01); *G06F 2212/154* (2013.01)

(56) References Cited

U.S. PATENT DOCUMENTS

| | | | | |
|---|---|---|---|---|
| 2011/0295942 | A1* | 12/2011 | Raghunath | H04L 45/04 709/203 |
| 2014/0344452 | A1* | 11/2014 | Lipstone | H04L 41/50 709/224 |
| 2016/0072667 | A1* | 3/2016 | Zhu | H04L 41/0896 709/220 |
| 2017/0339222 | A1* | 11/2017 | Newton | H04L 67/1097 |
| 2017/0366409 | A1* | 12/2017 | Yuan | H04L 41/0853 |

FOREIGN PATENT DOCUMENTS

| | | |
|---|---|---|
| CN | 104967873 A | 10/2015 |
| CN | 105450780 A | 3/2016 |
| CN | 105847401 A | 8/2016 |
| CN | 105871649 A | 8/2016 |
| CN | 105898352 A | 8/2016 |
| CN | 106603703 A | 4/2017 |
| CN | 105991459 B | 5/2019 |
| CN | 106888270 B | 6/2020 |
| WO | 2017218473 A1 | 12/2017 |

* cited by examiner

RETURN SOURCE RELATIONSHIP MANAGEMENT SYSTEM, METHOD, DEVICE, AND SERVER, AND STORAGE MEDIUM

The present application is a U.S. National Stage Application of PCT/CN2019/072937 filed Jan. 24, 2019, which claims the priority to a Chinese patent application No. 201810078366.9 filed with the China National Intellectual Property Administration on Jan. 26, 2018 and entitled "RETURN SOURCE RELATIONSHIP MANAGEMENT SYSTEM, METHOD, APPARATUS DEVICE, AND SERVER, AND STORAGE MEDIUM", which are incorporated herein by reference in their entirety.

TECHNICAL FIELD

The present application relates to network device management, and more particular, to a back-to-source relationship management system, method, apparatus, server, and storage medium.

BACKGROUND

At present, there are a large number of CDN (Content Delivery Network) nodes in a network system. Since the CDN nodes are set close to the client and can cache the content obtained from a source station through back to source. Each content cached by a CDN node corresponds to a source station, and the source station corresponding to a content can be understood as: an original storage location of the content. Therefore, when a user accesses a content, the content can be obtained directly from a CDN node nearby without the need to obtain the content from a remote source station that stores the content, which improves the speed of obtaining this content by the user.

Generally, a CDN node obtains a content from a source station through back to source based on a back-to-source configuration file. The above back-to-source configuration file is a file delivered by a back-to-source configuration file delivery server to the CDN nodes. The back-to-source configuration file is generated based on a correspondence between a domain name and a CDN node back-to-source relationship. That is, when a CDN node is to obtain a content from a source station through back to source, the CDN node requires to find in a locally stored source configuration file a next-hop device corresponding to a domain name of the content to be obtained through back to source, and perform back-to-source according to the found next-hop device and obtain the content. Furthermore, when the content cached by a CDN node needs to be refreshed, a content refresh server also needs to deliver a refresh instruction to the CDN node according to the CDN node back-to-source relationship corresponding to the domain name to implement content refresh.

A CDN node back-to-source relationship corresponding to one domain name can be understood as: a path from a CDN node back to a source station corresponding to the domain name. For example, a CDN node back-to-source relationship corresponding to a domain name a is: CDN1 node→CDN2 node→CDN3 node→ a source station of the domain name a; a CDN node back-to-source relationship corresponding to a domain name b is: CDN1 node→CDN3 node→CDN4 node→ a source station of the domain name b, and CDN1 node→CDN5 node→CDN6 node→ the source station of the domain name b.

In the related art, whenever a CDN node back-to-source relationship corresponding to one domain name is changed, a technician needs to manually modify CDN node back-to-source relationships corresponding to domain names stored in each cache management server, such as a back-to-source configuration file delivery server and a content refresh server, which results in larger workload, time-consuming, and error-prone.

Therefore, a technical problem to be solved is how to provide a back-to-source relationship management solution to enable unified management of CDN node back-to-source relationships corresponding to domain names, thereby reducing maintenance cost and error rate of the CDN node back-to-source relationship, and improving maintenance efficiency.

SUMMARY

An embodiment of the present disclosure provides a back-to-source relationship management system, the back-to-source relationship management system includes a back-to-source relationship management server and a cache management server;

the back-to-source relationship management server is configured for:

obtaining a target domain name corresponding to a target CDN node back-to-source relationship to be adjusted, and adjustment information for the target CDN node back-to-source relationship;

adjusting the target CDN node back-to-source relationship by using the adjustment information to obtain the adjusted target CDN node back-to-source relationship; wherein, the target CDN node back-to-source relationship is determined based on the target domain name and a first mapping relationship table, and the first mapping relationship table is configured for storing domain names and CDN node bask-to-source relationships in correspondence with each other;

synchronizing the target domain name and the adjusted target CDN node back-to-source relationship to the cache management server;

the cache management server is configured for:

receiving the target domain name and the adjusted target CDN node back-to-source relationship sent by the back-to-source relationship management server;

updating a CDN node back-to-source relationship corresponding to the target domain name stored in the cache management server by using the adjusted target CDN node back-to-source relationship to obtain a new CDN node back-to-source relationship.

An embodiment of the present disclosure provides a back-to-source relationship management method, which is applied to a back-to-source relationship management server in the back-to-source relationship management system. The back-to-source relationship management system further includes a cache management server, and the cache management server is configured for caching a mapping relationship between a domain name and a CDN node back-to-source relationship. The method may include:

obtaining a target domain name corresponding to a target CDN node back-to-source relationship to be adjusted, and adjustment information for the target CDN node back-to-source relationship;

adjusting the target CDN node back-to-source relationship by using the adjustment information to obtain the adjusted target CDN node back-to-source relationship; wherein, the target CDN node back-to-source relationship is determined based on the target domain name and a first mapping relationship table, and the first mapping relationship table is configured for storing domain names and CDN node bask-to-source relationships in correspondence with each other;

synchronizing the target domain name and the adjusted target CDN node back-to-source relationship to the cache management server.

An embodiment of the present disclosure further provides a back-to-source relationship management method, which is applied to a cache management server in a back-to-source relationship management system. The back-to-source relationship management system further includes a back-to-source relationship management server, the method may include:

receiving a target domain name and an adjusted target CDN node back-to-source relationship sent by the back-to-source relationship management server;

updating the CDN node back-to-source relationship corresponding to the target domain name stored in the cache management server by using the adjusted target CDN node back-to-source relationship to obtain a new CDN node back-to-source relationship.

An embodiment of the present disclosure provides a back-to-source relationship management apparatus, which is applied to a back-to-source relationship management server in the back-to-source relationship management system. The back-to-source relationship management system further includes a cache management server, and the cache management server is configured for caching a mapping relationship between a domain name and a CDN node back-to-source relationship. The apparatus may include:

an obtaining unit, configured for obtaining a target domain name corresponding to a target CDN node back-to-source relationship to be adjusted, and adjustment information for the target CDN node back-to-source relationship;

an adjusting unit, configured for adjusting the target CDN node back-to-source relationship by using the adjustment information to obtain the adjusted target CDN node back-to-source relationship; wherein, the target CDN node back-to-source relationship is determined based on the target domain name and a first mapping relationship table, and the first mapping relationship table is configured for storing domain names and CDN node bask-to-source relationships in correspondence with each other;

a synchronizing unit, configured for synchronizing the target domain name and the adjusted target CDN node back-to-source relationship to the cache management server.

An embodiment of the present disclosure further provides a back-to-source relationship management apparatus, which is applied to a cache management server in a back-to-source relationship management system. The back-to-source relationship management system further includes a back-to-source relationship management server, the apparatus may include:

a receiving unit, configured for receiving a target domain name and an adjusted target CDN node back-to-source relationship sent by the back-to-source relationship management server;

an updating unit, configured for updating the CDN node back-to-source relationship corresponding to the target domain name stored in the cache management server by using the adjusted target CDN node back-to-source relationship to obtain a new CDN node back-to-source relationship.

An embodiment of the present disclosure further provides a back-to-source relationship management server, the back-to-source relationship management server is a server in a back-to-source relationship management system, the back-to-source relationship management system further includes a cache management server, the cache management server is configured for caching a mapping relationship between the domain name and the CDN node back-to-source relationship; the back-to-source relationship management server includes a processor, a communication interface, a memory and a communication bus, wherein the processor, the communication interface, and the memory communicate with each other through the communication bus;

the memory is configured for storing a computer program;

the processor is configured for executing the program stored on the memory to implement method provided in any one of method embodiments.

An embodiment of the present disclosure further provides a cache management server, the cache management server is a server in a back-to-source relationship management system, the back-to-source relationship management system further includes a back-to-source relationship management server; the back-to-source relationship management server includes a processor, a communication interface, a memory and a communication bus, wherein the processor, the communication interface, and the memory communicate with each other through the communication bus;

the memory is configured for storing a computer program;

the processor is configured for implementing method steps provided in any one of method embodiments when the program stored on the memory is executed.

An embodiment of the present disclosure further provides a storage medium, which is a storage medium in a back-to-source relationship management server, the back-to-source relationship management server is a server in a back-to-source relationship management system, and the back-to-source relationship management system further includes a cache management server, and the cache management server is configured for caching a mapping relationship between the domain name and the CDN node back-to-source relationship; the storage medium stores a computer program, which implements method steps provided in any one of method embodiments when the computer program is executed by the processor. The storage medium is a computer readable storage medium.

An embodiment of the present disclosure further provides a storage medium, which is a storage medium in a cache management server, the cache management server is a server in a back-to-source relationship management system, and the back-to-source relationship management system further includes a back-to-source relationship management server; the storage medium stores a computer program, which implements method steps provided in any one of method embodiments when the computer program is executed by the processor. Wherein, the storage medium is a computer readable storage medium.

An embodiment of the present disclosure further provides a computer program product, which is configured for implementing method steps provided in any one of method embodiments when executing.

An embodiment of the present disclosure further provides a computer program product, which is configured for implementing method steps provided in any one of method embodiments when executing.

BRIEF DESCRIPTION OF THE DRAWINGS

In order to more clearly describe the technical solution of the embodiments of the application and the related art, drawings needed in the embodiments and the related art will be briefly described below. Obviously, the drawings described below are for only some embodiments of the present disclosure, one of ordinary skills in the art can also obtain other drawings based on these drawings without any creative efforts.

DETAILED DESCRIPTION

In order to make objectives, technical solutions and advantages of the present disclosure more apparent, the present disclosure now will be described in detail with reference to the accompanying drawings and the detailed description. Obviously, the embodiments described are only some of the embodiments of the present disclosure instead of all the embodiments. All further embodiments obtained by those of ordinary skills in the art based on the embodiments herein without any creative efforts are within the scope of the present disclosure.

In order to solve problems in the related art, embodiments of the present disclosure provide a back-to-source relationship management system, method, apparatus, server, and storage medium.

First, from the perspective of a back-to-source relationship management server, a back-to-source relationship management method provided in the embodiment of the present disclosure will be described below.

In an embodiment of the present disclosure, the back-to-source relationship management method is applied to a back-to-source relationship management server in a back-to-source relationship management system. The back-to-source relationship management system further includes a cache management server. The back-to-source relationship management system may also be called a CDN (Content Delivery Network) center control system.

The number of cache management servers in the back-to-source relationship management system may be one or more. Each cache management server is configured for caching a mapping relationship between cache domain names and CDN node back-to-source relationships and managing contents cached by CDN nodes based on the mapping relationship between the cache domain names and the CDN node back-to-source relationships cached by the cache management server.

For example, when the cache management server is a back-to-source configuration file delivery server, the cache server delivers a back-to-source configuration file to a CDN node corresponding to a domain name based on the cached mapping relationship between domain names and CDN node back-to-source relationships so as to manage the contents cached by CDN nodes by means of the back-to-source configuration file.

The back-to-source relationship management server may store a CDN node back-to-source relationship cached in the cache management server in the back-to-source relationship management system, and uniformly manage the CDN node back-to-source relationship cached in the cache management server in the back-to-source relationship management system. Specific management methods may be referred to the method steps shown in FIG. 1.

Figure 1:
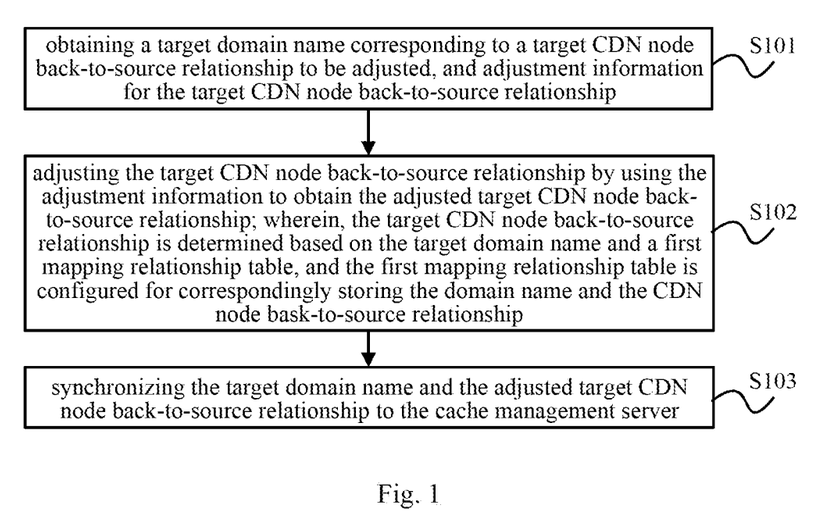
FIG. 1 is a flowchart of a back-to-source relationship management method according to an embodiment of the present disclosure.

Referring to FIG. 1, the method may include the following steps:

S101: obtaining a target domain name corresponding to a target CDN node back-to-source relationship to be adjusted, and adjustment information for the target CDN node back-to-source relationship;

S102: adjusting the target CDN node back-to-source relationship by using the adjustment information to obtain the adjusted target CDN node back-to-source relationship; wherein, the target CDN node back-to-source relationship is determined based on the target domain name and a first mapping relationship table, and the first mapping relationship table is configured for correspondingly storing the domain name and the CDN node bask-to-source relationship;

S103: synchronizing the target domain name and the adjusted target CDN node back-to-source relationship to the cache management server.

Optionally, obtaining a target domain name corresponding to a target CDN node back-to-source relationship to be adjusted and adjustment information for the target CDN node back-to-source relationship may include:

receiving a target domain name corresponding to the target CDN node back-to-source relationship to be adjusted;

determining, based on the first mapping relationship table, a target CDN node back-to-source relationship corresponding to the target domain name;

sending information determined from the target CDN node back-to-source relationship to a user terminal, so that the user terminal obtains and displays a topology structure diagram corresponding to the target CDN node back-to-source relationship based on the information;

receiving and using adjustment information for the topology structure diagram sent by the user terminal as adjustment information for the target CDN node back-to-source relationship.

Optionally, the adjustment information for the topology structure diagram may include at least one of the following information:

operation information for adding CDN nodes in the topology structure diagram;

operation information for deleting CDN nodes in the topology structure diagram;

operation information for modifying CDN nodes in the topology structure diagram;

operation information for modifying a connection relationship between CDN nodes.

Optionally, determining, based on the first mapping relationship table, a target CDN node back-to-source relationship corresponding to the target domain name may include:

determining whether the target domain name can be found in the first mapping relationship table;

if the target domain name can be found in the first mapping relationship table, finding, in the first mapping relationship table, a target CDN node back-to-source relationship corresponding to the target domain name.

Optionally, if the target domain name cannot be found in the first mapping relationship table, the method may further include:

using a preset CDN node back-to-source relationship as a target CDN node back-to-source relationship corresponding to the target domain name.

It can be understood that, in the embodiment of the present disclosure, when the target CDN node back-to-source relationship stored in the back-to-source relationship management server needs to be adjusted, the back-to-source relationship management server can obtain the target domain name corresponding to the target CDN node back-to-source relationship, and find the target CDN node back-to-source relationship corresponding to the target domain name by using the first mapping relationship table stored in the target domain name and the back-to-source relationship management server, wherein, the first mapping relationship table is configured for correspondingly storing the domain name and the CDN node back-to-source relationship. Then, the back-to-source relationship management server may adjust the target CDN node back-to-source relationship according to the obtained adjustment information for the target CDN node back-to-source relationship to obtain the adjusted target CDN node back-to-source relationship. Furthermore, the target domain name and the adjusted target CDN node back-to-source relationship may be synchronized to the cache management server. In this way, a technician does not need to manually modify the CDN node back-to-source relationship corresponding to each domain name stored in the cache management server, thereby reducing maintenance cost and error rate of the CDN node back-to-source relationship, and improving maintenance efficiency.

It can be understood that, in one implementation, the back-to-source relationship management server can simultaneously obtain a target domain name corresponding to a target CDN node back-to-source relationship to be adjusted and adjustment information for the target CDN node back-to-source relationship. In this way, the speed of obtaining the target domain name and adjusting the information may be increased.

For example, the back-to-source relationship management server can simultaneously obtain a target domain name: domain name a; a target CDN node back-to-source relationship corresponding to the domain name a: $CDN_1$ node→$CDN_2$ node→$CDN3$ node→source station of domain name a; and adjustment information of the target CDN node back-to-source relationship: modifying $CDN_2$ node to $CDN_5$ node. The adjustment information is only an example, and is not limited herein.

In another implementation, after obtaining a target domain name corresponding to the target CDN node back-to-source relationship to be adjusted, the back-to-source relationship management server may determine a target CDN node back-to-source relationship corresponding to the target domain name by using a first mapping relationship table, send information determined from the target CDN node back-to-source relationship to a user terminal so that the user terminal obtains a topology structure diagram corresponding to the target CDN node back-to-source relationship based on the information, and displays the topology structure diagram to the user. Then, the user terminal generates, based on adjustment of the topology structure diagram by the user, adjustment information for the target topology structure diagram, and sends the adjustment information to the back-to-source relationship management server. Thus, the back-to-source relationship management server can obtain and use the adjustment information as adjustment information for the target CDN node back-to-source relationship. In this way, the target CDN node back-to-source relationship can be displayed to the user very intuitively, so that the user can view and adjust the target CDN node back-to-source relationship.

Those skilled in the art can understand that, in the process of adjusting the target CDN node back-to-source relationship, levels of CDN nodes in the back-to-source relationship may also be adjusted.

The information determined from the target CDN node back-to-source relationship may be the target CDN node back-to-source relationship itself. In this case, the user terminal may generate a topology structure diagram based on the target CDN node back-to-source relationship, and then display the topology structure diagram to the user. Of course, the information determined from the target CDN node back-to-source relationship may also be a topology structure diagram generated based on the target CDN node back-to-source relationship, which is all reasonable. In addition, the target CDN node back-to-source relationship may be stored by using a topology structure, and any service that depends on the topology structure may obtain the topology structure by invoking an interface of the topology structure.

In addition, an adjustment of the topology structure diagram by the user may be one or more of operations of adding, deleting, and modifying CDN nodes in the topology structure diagram, and modifying a connection relationship between the CDN nodes, all of which is reasonable.

Accordingly, the adjustment information generated by the user terminal for the target topology structure diagram may include at least one of the following information: corresponding operation information for adding CDN nodes in the topology structure diagram; corresponding operation information for deleting CDN nodes in the topology structure diagram; corresponding operation information for modifying CDN nodes in the topology structure diagram; corresponding operation information for modifying a connection relationship between the CDN nodes.

Figure 2:
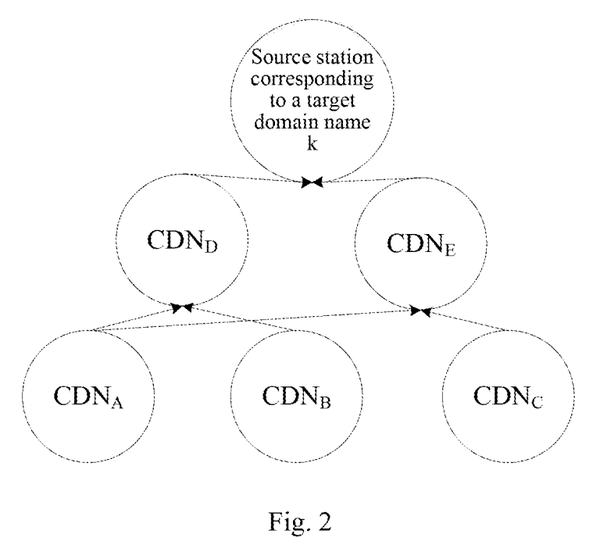
FIG. 2 is a topology structure diagram according to an embodiment of the present disclosure.

Referring to FIG. 2, it is assumed that the topology structure diagram shown in FIG. 2 is a topology structure diagram generated based on a target CDN node back-to-source relationship corresponding to a target domain name k. Then, the user terminal may display the topology structure diagram, and the user may adjust the topology structure diagram by operating the user terminal, for example, removing the connection from $CDN_A$ to $CDN_E$. In this way, the user terminal may generate adjustment information for the topology structure diagram according to the operation, and sends the adjustment information to a back-to-source relationship management server. Therefore, the back-to-source relationship management server may adjust the target CDN node back-to-source relationship corresponding to the target domain name k according to the adjustment information. Further, the back-to-source relationship management server may send the adjusted target CDN node back-to-source relationship to the cache management server, so that the user does not need to manually adjust the target CDN node back-to-source relationship corresponding to the target domain name k in the cache server, which saves time and effort and avoids mistakes. In addition, when there are multiple cache management servers that need to modify the target CDN node back-to-source relationship, it may be avoided that a technician manually modifies the target CDN node back-to-source relationship in each cache management server with a time difference, resulting in data heterogeneous in each cache management server during a period of time corresponding to the time difference.

The back-to-source relationship management server may synchronize the adjusted target CDN node back-to-source relationship to all cache management servers in the back-to-source relationship management system. Of course, the adjusted target CDN node back-to-source relationship may be synchronized to a cache management server corresponding to the target domain name K in the back-to-source relationship management system according to the mapping relationship between a pre-stored target domain name and the cache management server, which is reasonable.

In addition, the operation of determining the target CDN node back-to-source relationship corresponding to the target domain name by using a first mapping relationship table performed by the back-to-source relationship management server may include: determining whether the target domain name can be found in the first mapping relationship table. If determining that the target domain name can be found in the first mapping relationship table, the target CDN node back-to-source relationship corresponding to the target domain name is found in the first mapping relationship table. If the target domain name cannot be found in the first mapping relationship table, a preset CDN node back-to-source relationship may be used as a target CDN node back-to-source relationship corresponding to the target domain name.

The preset CDN node back-to-source relationship may be set by those skilled in the art according to specific conditions, and details are not described herein.

In the following, from the perspective of a cache management server, a back-to-source relationship management method according to an embodiment of the present disclosure will be described.

In the embodiment of the present disclosure, the back-to-source relationship management method is applied to a cache management server in a CDN (Content Delivery Network) center control system. The back-to-source relationship management system further includes a cache management server.

The back-to-source relationship management server is configured for storing a CDN node back-to-source relationship cached in the cache management server in the back-to-source relationship management system, adjusting the CDN node back-to-source relationship cached in the cache management server in the back-to-source relationship management system, and synchronizing the adjusted CDN node back-to-source relationship to the cache management server.

The cache management server is configured for managing a mapping relationship between cache domain names and a CDN node back-to-source relationship cached by the cache management server, and managing contents cached by CDN nodes based on the mapping relationship between the cache domain names and the CDN node back-to-source relationship cached by the cache management server. For example, when the cache management server is a back-to-source configuration file delivery server, the cache server delivers a back-to-source configuration file to a CDN node corresponding to the domain name based on the cached mapping relationship between the domain names and CDN node back-to-source relationship so as to manage the contents cached by CDN nodes by using the back-to-source configuration file.

Figure 3:
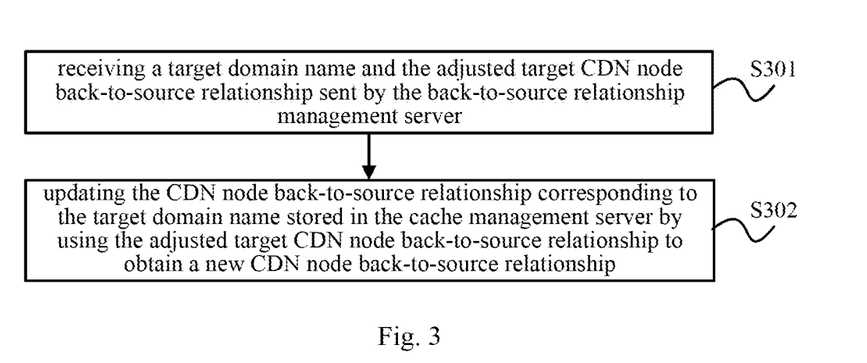
FIG. 3 is another flowchart of a back-to-source relationship management method according to an embodiment of the present disclosure.

A manner of managing the CDN node back-to-source relationship may be referred to method steps shown in FIG. 3. Referring to FIG. 3, the method may include the following steps:

S301: receiving a target domain name and the adjusted target CDN node back-to-source relationship sent by the back-to-source relationship management server;

S302: updating the CDN node back-to-source relationship corresponding to the target domain name stored in the cache management server by using the adjusted target CDN node back-to-source relationship to obtain a new CDN node back-to-source relationship.

Optionally, the cache management server includes a back-to-source configuration file delivery server and/or a content refresh server; the method may further includes:

when the cache management server is the back-to-source configuration file delivery server, generating, based on the new CDN node back-to-source relationship, back-to-source configuration files for CDN nodes in the new CDN node back-to-source relationship, and delivering the generated back-to-source configuration files to corresponding CDN nodes;

when the cache management server is the content refresh server, generating, based on the new CDN node back-to-source relationship, refresh instructions for CDN nodes in the new CDN node back-to-source relationship, and delivering the generated refresh instructions to corresponding CDN nodes.

It can be understood that, in the embodiment of the present disclosure, when the target CDN node back-to-source relationship stored in the cache management server needs to be adjusted, the cache management server can receive the target domain name and the adjusted target CDN node back-to-source relationship sent by the back-to-source relationship management server. Then, the cache management server can find the target CDN node back-to-source relationship corresponding to the target domain name stored in the cache management server according to the target domain name, and use the adjusted target CDN node back-source relationship to update the target CDN node back-to-source relationship and obtain a new CDN node back-to-source relationship corresponding to the target domain name. In this way, a technician does not need to manually modify the CDN node back-to-source relationship corresponding to each domain name stored in the cache management server, thereby reducing maintenance cost and error rate of the CDN node back-to-source relationship, and improving maintenance efficiency.

It can be understood that the cache management server may include a back-to-source configuration file delivery server and/or a content refresh server. Of course, it is not limited herein.

When the cache management server is a back-to-source configuration file delivery server, the cache management server may also perform the following operations: generating, based on the new CDN node back-to-source relationship, back-to-source configuration files for CDN nodes in the new CDN node back-to-source relationship, and delivering the generated back-to-source configuration files to corresponding CDN nodes, so that the CDN nodes perform back-to-source based on the received back-to-source configuration file.

When the cache management server is a content refresh server, the cache management server may also perform the following operations: generating, based on the new CDN node back-to-source relationship, refresh instructions for CDN nodes in the new CDN node back-to-source relationship, and delivering the generated refresh instructions to corresponding CDN nodes, so that the CDN nodes refresh cached contents according to the received refresh instruction.

Corresponding to the embodiment of the back-to-source relationship management method described from the perspective of the back-source relationship management server, the embodiment of the present disclosure further provides a back-to-source relationship management apparatus.

Figure 4:
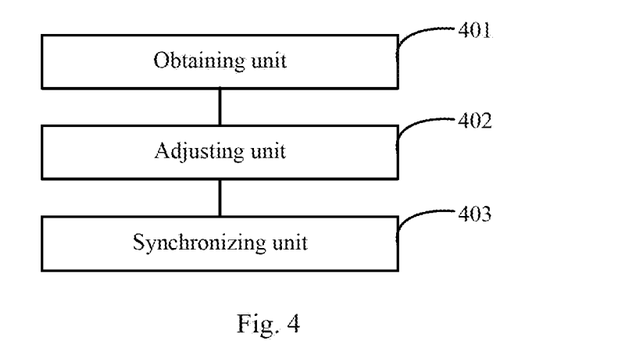
FIG. 4 is a schematic structural diagram of a back-to-source relationship management apparatus according to an embodiment of the present disclosure.

Referring to FIG. 4, an embodiment of the present disclosure provides a back-to-source relationship management apparatus, which is applied to a back-to-source relationship management server in the back-to-source relationship management system. The back-to-source relationship management system further includes a cache management server, and the cache management server is configured for caching a mapping relationship between a domain name and a CDN node back-to-source relationship. The apparatus may include:

an obtaining unit 401, configured for obtaining a target domain name corresponding to a target CDN node back-to-source relationship to be adjusted, and adjustment information for the target CDN node back-to-source relationship;

an adjusting unit 402, configured for adjusting the target CDN node back-to-source relationship by using the adjustment information to obtain the adjusted target CDN node back-to-source relationship; wherein, the target CDN node back-to-source relationship is determined based on the target domain name and a first mapping relationship table, and the first mapping relationship table is configured for storing domain names and CDN node bask-to-source relationships in correspondence with each other;

a synchronizing unit 403, configured for synchronizing the target domain name and the adjusted target CDN node back-to-source relationship to the cache management server.

Optionally, the obtaining unit may include:

a first receiving sub-unit, configured for receiving a target domain name corresponding to the target CDN node back-to-source relationship to be adjusted;

a determining sub-unit, configured for determining, based on the first mapping relationship table, a target CDN node back-to-source relationship corresponding to the target domain name;

a sending sub-unit, configured for sending information determined from the target CDN node back-to-source relationship to a user terminal, so that the user terminal obtains and displays a topology structure diagram corresponding to the target CDN node back-to-source relationship based on the information;

a second receiving sub-unit, configured for receiving and using adjustment information for the topology structure diagram sent by the user terminal as adjustment information for the target CDN node back-to-source relationship.

Optionally, the adjustment information for the topology structure diagram may include at least one of the following information:

operation information for adding CDN nodes in the topology structure diagram;

operation information for deleting CDN nodes in the topology structure diagram;

operation information for modifying CDN nodes in the topology structure diagram;

operation information for modifying a connection relationship between CDN nodes.

Optionally, in the embodiment of the present disclosure, the determining sub-unit includes:

a judging module, configured for determining, after obtaining a target domain name corresponding to a target CDN node back-to-source relationship to be adjusted and adjustment information for the target CDN node back-to-source relationship, whether the target domain name can be found in the first mapping relationship table;

a finding module, configured for finding, when the target domain name can be found in the first mapping relationship table, a target CDN node back-to-source relationship corresponding to the target domain name in the first mapping relationship table.

Optionally, in the embodiment of the present disclosure, the apparatus may further include:

a determining module, configured for using, when the target domain name cannot be found in the first mapping relationship table, a preset CDN node back-to-source relationship as a target CDN node back-to-source relationship corresponding to the target domain name.

It can be understood that, in the embodiment of the present disclosure, when the target CDN node back-to-source relationship stored in the back-to-source relationship management server needs to be adjusted, the back-to-source relationship management server can obtain the target domain name corresponding to the target CDN node back-to-source relationship. Then, the target CDN node back-to-source relationship corresponding to the target domain name is found by using the first mapping relationship table stored in the target domain name and the back-to-source relationship management server, Wherein, the first mapping relationship table is configured for correspondingly storing the domain name and the CDN node back-to-source relationship. Then, the back-to-source relationship management server may adjust the target CDN node back-to-source relationship according to the obtained adjustment information for the target CDN node back-to-source relationship to obtain the adjusted target CDN node back-to-source relationship. Furthermore, the target domain name and the adjusted target CDN node back-to-source relationship may be synchronized to the cache management server. In this way, a technician does not need to manually modify the CDN node back-to-source relationship corresponding to each domain name stored in the cache management server, thereby reducing maintenance cost and error rate of the CDN node back-to-source relationship, and improving maintenance efficiency.

Optionally, in the embodiment of the present disclosure, the obtaining unit 401 may include:

a first receiving sub-unit, configured for receiving the target domain name corresponding to the target CDN node back-to-source relationship to be adjusted;

a determining sub-unit, configured for determining, based on the first mapping relationship table, a target CDN node back-to-source relationship corresponding to the target domain name;

a sending sub-unit, configured for sending information determined from the target CDN node back-to-source relationship to a user terminal, so that the user terminal obtains and displays a topology structure diagram corresponding to the target CDN node back-to-source relationship based on the information;

a second receiving sub-unit, configured for receiving and using adjustment information for the topology structure diagram sent by the user terminal as adjustment information for the target CDN node back-to-source relationship.

Optionally, in the embodiment of the present disclosure, the adjustment information for the topology structure diagram may include at least one of the following information:

operation information for adding CDN nodes in the topology structure diagram;

operation information for deleting CDN nodes in the topology structure diagram;

operation information for modifying CDN nodes in the topology structure diagram;

operation information for modifying a connection relationship between CDN nodes.

Optionally, in the embodiment of the present disclosure, the determining sub-unit includes:

a judging module, configured for determining, after obtaining a target domain name corresponding to a target CDN node back-to-source relationship to be adjusted and adjustment information for the target CDN node back-to-source relationship, whether the target domain name can be found in the first mapping relationship table;

a finding module, configured for, when the target domain name can be found in the first mapping relationship table, finding, in the first mapping relationship table, a target CDN node back-to-source relationship corresponding to the target domain name.

Optionally, in the embodiment of the present disclosure, the apparatus may further include:

a determining module, configured for using, the target domain name cannot be found in the first mapping relationship table, a preset CDN node back-to-source relationship as a target CDN node back-to-source relationship corresponding to the target domain name.

Wherein, since the apparatus embodiment is basically similar to the method embodiment provided from the perspective of the back-to-source relationship management server, the description is relatively simple. For the related part, refer to the part of the method embodiment provided from the perspective of the back-to-source relationship management server.

Corresponding to the embodiment of the back-to-source relationship management method provided from the perspective of the cache management server, an embodiment of the present disclosure further provides a back-to-source relationship management apparatus.

Figure 5:
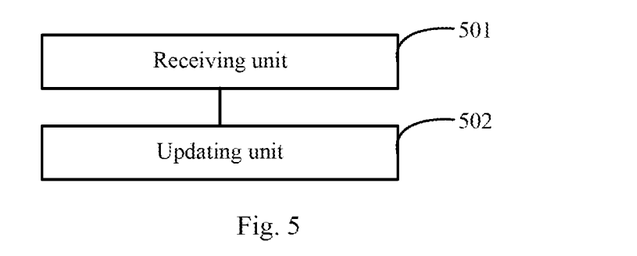
FIG. 5 is another schematic structural diagram of a back-to-source relationship management apparatus according to an embodiment of the present disclosure.

Referring to FIG. 5, a back-to-source relationship management apparatus according to an embodiment of the present disclosure is applied to a cache management server in a back-to-source relationship management system. The back-to-source relationship management system further includes a back-to-source relationship management server, the apparatus may include:

a receiving unit 501, configured for receiving a target domain name and an adjusted target CDN node back-to-source relationship sent by the back-to-source relationship management server;

an updating unit 502, configured for updating the CDN node back-to-source relationship corresponding to the target domain name stored in the cache management server by using the adjusted target CDN node back-to-source relationship to obtain a new CDN node back-to-source relationship.

Optionally, the cache management server includes a back-to-source configuration file delivery server and/or a content refresh server; the apparatus may further includes:

a first generating unit, configured for, when the cache management server is a back-to-source configuration file delivery server, generating, based on the new CDN node back-to-source relationship, back-to-source configuration files for CDN nodes in the new CDN node back-to-source relationship, and delivering the generated back-to-source configuration files to corresponding CDN nodes;

a second generating unit, configured for, when the cache management server is a content refresh server, generating, based on the new CDN node back-to-source relationship, refresh instructions for CDN nodes in the new CDN node back-to-source relationship, and delivering the generated refresh instructions to corresponding CDN nodes.

It can be understood that, in the embodiment of the present disclosure, when the target CDN node back-to-source relationship stored in the cache management server needs to be adjusted, the cache management server can receive the target domain name and the adjusted target CDN node back-to-source relationship sent by the back-to-source relationship management server. Then, the cache management server can find the target CDN node back-to-source relationship corresponding to the target domain name stored in the cache management server according to the target domain name, and use the adjusted target CDN node back-source relationship to update the target CDN node back-to-source relationship and obtain a new CDN node back-to-source relationship corresponding to the target domain name. In this way, a technician does not need to manually modify the CDN node back-to-source relationship corresponding to each domain name stored in the cache management server, thereby reducing maintenance cost and error rate of the CDN node back-to-source relationship, and improving maintenance efficiency.

Optionally, in the embodiment of the present disclosure, the cache management server includes a back-to-source configuration file delivery server and/or a content refresh server; the apparatus may further includes:

a first generating unit, configured for, when the cache management server is a back-to-source configuration file delivery server, generating, based on the new CDN node back-to-source relationship, back-to-source configuration files for CDN nodes in the new CDN node back-to-source relationship, and delivering the generated back-to-source configuration files to corresponding CDN nodes;

a second generating unit, configured for, when the cache management server is a content refresh server, generating, based on the new CDN node back-to-source relationship, refresh instructions for CDN nodes in the new CDN node back-to-source relationship, and delivering the generated refresh instructions to corresponding CDN nodes.

Wherein, since the apparatus embodiment is basically similar to the method embodiment provided from the perspective of the cache management server, the description is relatively simple. For the related part, refer to the part of the method embodiment provided from the perspective of the cache management server.

Corresponding to the embodiment of the back-to-source relationship management method provided from the perspective of the back-source relationship management server, an embodiment of the present disclosure further provides a back-to-source relationship management server.

Figure 6:
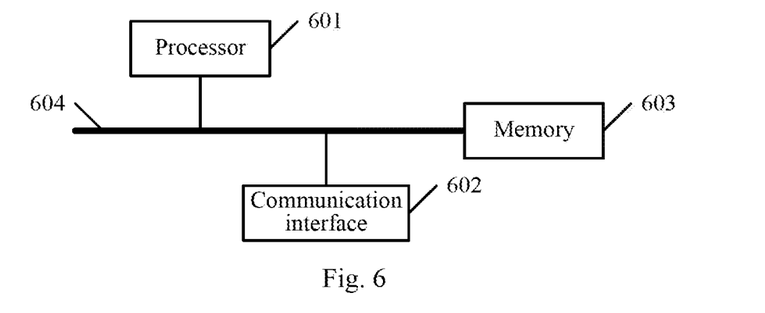
FIG. 6 is a schematic structural diagram of a back-to-source relationship management server according to an embodiment of the present disclosure.

Referring to FIG. 6, a back-to-source relationship management server according to an embodiment of the present disclosure is a server in a back-to-source relationship management system, the back-to-source relationship management system further includes a cache management server, the cache management server is configured for caching a mapping relationship between a domain name and a CDN node back-to-source relationship; the back-to-source relationship management server includes a processor 601, a communication interface 602, a memory 603 and a communication bus 604, wherein the processor 601, the communication interface 602, and the memory 603 communicate with each other through the communication bus 604;

the memory 603 is configured for storing a computer program;

the processor 601 is configured for implementing method steps of any one of embodiments of the back-to-source relationship management method provided from the perspective of the back-source relationship management server when the program stored on the memory 603 is executed.

It can be understood that, in the embodiment of the present disclosure, when the target CDN node back-to-source relationship stored in the back-to-source relationship management server needs to be adjusted, the back-to-source relationship management server can obtain the target domain name corresponding to the target CDN node back-to-source relationship. Then, the target CDN node back-to-source relationship corresponding to the target domain name is found by using the first mapping relationship table stored in the target domain name and the back-to-source relationship management server, Wherein, the first mapping relationship table is configured for correspondingly storing the domain name and the CDN node back-to-source relationship. Then, the back-to-source relationship management server may adjust the target CDN node back-to-source relationship according to the obtained adjustment information for the target CDN node back-to-source relationship to obtain the adjusted target CDN node back-to-source relationship. Furthermore, the target domain name and the adjusted target CDN node back-to-source relationship may be synchronized to the cache management server. In this way, a technician does not need to manually modify the CDN node back-to-source relationship corresponding to each domain name stored in the cache management server, thereby reducing maintenance cost and error rate of the CDN node back-to-source relationship, and improving maintenance efficiency.

Corresponding to the embodiment of the back-to-source relationship management method provided from the perspective of the cache management server, the embodiment of the present disclosure further provides a cache management server.

Figure 7:
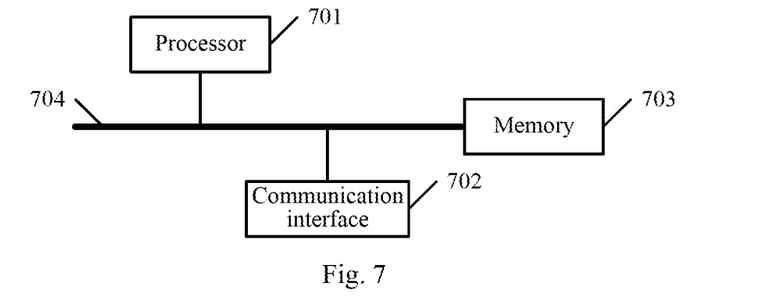
FIG. 7 is a schematic structural diagram of a cache management server according to an embodiment of the present disclosure.

Referring to FIG. 7, a cache management server according to an embodiment of the present disclosure is a server in a back-to-source relationship management system, the back-to-source relationship management system further includes a back-to-source relationship management server; the back-to-source relationship management server includes a processor 701, a communication interface 702, a memory 703 and a communication bus 704, wherein the processor 701, the communication interface 702, and the memory 703 communicate with each other through the communication bus 704;

the memory 703 is configured for storing a computer program;

the processor 701 is configured for implementing method steps of any one of embodiments of the back-to-source relationship management method provided from the perspective of the cache management server when the program stored on the memory 703 is executed.

It can be understood that, in the embodiment of the present disclosure, when the target CDN node back-to-source relationship stored in the cache management server needs to be adjusted, the cache management server can receive the target domain name and the adjusted target CDN node back-to-source relationship sent by the back-to-source relationship management server. Then, the cache management server can find the target CDN node back-to-source relationship corresponding to the target domain name stored in the cache management server according to the target domain name, and use the adjusted target CDN node back-source relationship to update the target CDN node back-to-source relationship and obtain a new CDN node back-to-source relationship corresponding to the target domain name. In this way, a technician does not need to manually modify the CDN node back-to-source relationship corresponding to each domain name stored in the cache management server, thereby reducing maintenance cost and error rate of the CDN node back-to-source relationship, and improving maintenance efficiency.

The communication bus aforementioned in the electronic device may be a peripheral component interconnect (PCI) bus or an extended industry standard architecture (EISA) bus and the like. The communication bus can include an address bus, a data bus, a control bus, or the like. For representation, only one thick line is shown in the figure, which does not mean there is only one communication bus or one type of communication bus.

the communications interface is configured for communication between the aforementioned electronic device and other devices.

The memory can include a random access memory (RAM), or can include a non-volatile memory (NVM), for example at least one disk memory. Optionally, the memory can also be at least one storage device located away from the processor described above.

The aforementioned processor can be a general-purpose processor, such as a central processing unit (CPU), a network processor (NP), or the like; it can also be a digital signal processor (DSP), an application specific integrated circuit (ASIC), a field-programmable gate array (FPGA) or other programmable logic device, a discrete gate or transistor logic device, a discrete hardware component.

Figure 8:
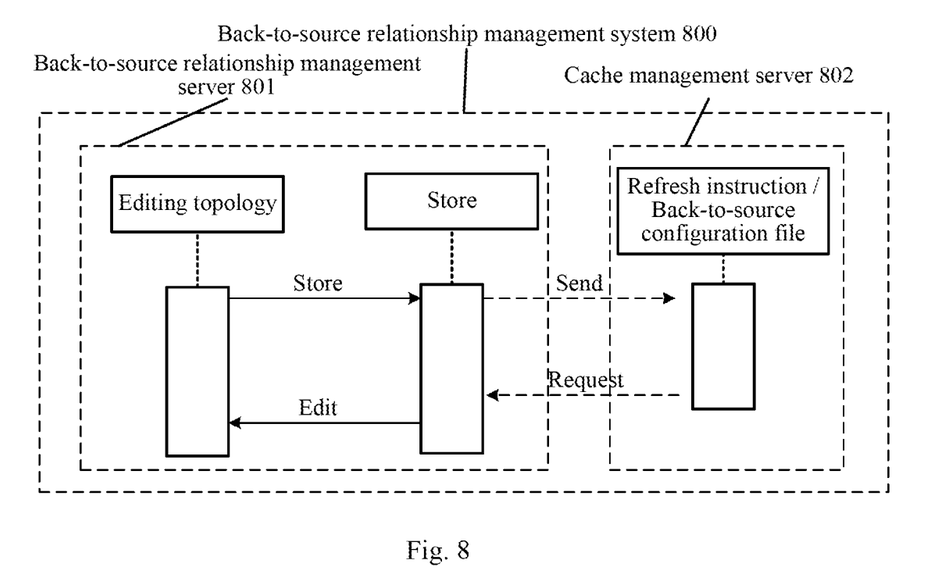
FIG. 8 is a schematic diagram of a back-to-source relationship management system according to an embodiment of the present disclosure.

Corresponding to the embodiments of the back-to-source relationship management server and the cache management server described above, an embodiment of the present disclosure further provides a back-to-source relationship management system. Referring to FIG. 8, the back-to-source relationship management system 800 may include: a back-to-source relationship management server 801 and a cache management server 802;

the back-to-source relationship management server 801 is configured for:

obtaining a target domain name corresponding to a target CDN node back-to-source relationship to be adjusted, and adjustment information for the target CDN node back-to-source relationship;

adjusting the target CDN node back-to-source relationship by using the adjustment information to obtain the adjusted target CDN node back-to-source relationship; wherein, the target CDN node back-to-source relationship is determined based on the target domain name and a first mapping relationship table, and the first mapping relationship table is configured for storing domain names and CDN node bask-to-source relationships in correspondence with each other;

synchronizing the target domain name and the adjusted target CDN node back-to-source relationship to the cache management server;

the cache management server 802 is configured for:

receiving the target domain name and the adjusted target CDN node back-to-source relationship sent by the back-to-source relationship management server;

updating a CDN node back-to-source relationship corresponding to the target domain name stored in the cache management server by using the adjusted target CDN node back-to-source relationship to obtain a new CDN node back-to-source relationship.

Optionally, the cache management server includes a back-to-source configuration file delivery server and/or a content refresh server;

when the cache management server is a back-to-source configuration file delivery server, the back-to-source configuration file delivery server is further configured for:

generating, based on the new CDN node back-to-source relationship, back-to-source configuration files for CDN nodes in the new CDN node back-to-source relationship, and delivering the generated back-to-source configuration files to corresponding CDN nodes;

when the cache management server is a content refresh server, the content refresh server is further configured for: generating, based on the new CDN node back-to-source relationship, refresh instructions for CDN nodes in the new CDN node back-to-source relationship, and delivering the generated refresh instructions to corresponding CDN nodes.

Optionally, the back-to-source relationship management server is further configured for obtaining a target domain name corresponding to the target CDN node back-to-source relationship to be adjusted and adjustment information for the target CDN node back-to-source relationship by:

receiving the target domain name corresponding to the target CDN node back-to-source relationship to be adjusted;

determining, based on the first mapping relationship table, a target CDN node back-to-source relationship corresponding to the target domain name;

sending information determined from the target CDN node back-to-source relationship to a user terminal, so that the user terminal obtains and displays a topology structure diagram corresponding to the target CDN node back-to-source relationship based on the information;

receiving and using adjustment information for the topology structure diagram sent by the user terminal as adjustment information for the target CDN node back-to-source relationship.

Optionally, the adjustment information for the topology structure diagram may include at least one of the following information:

operation information for adding CDN nodes in the topology structure diagram;

operation information for deleting CDN nodes in the topology structure diagram;

operation information for modifying CDN nodes in the topology structure diagram;

operation information for modifying a connection relationship between CDN nodes.

Optionally, the back-to-source relationship management server is further configured for determining, based on the first mapping relationship table, a target CDN node back-to-source relationship corresponding to the target domain name by:

determining whether the target domain name can be found in the first mapping relationship table;

if the target domain name can be found in the first mapping relationship table, finding, in the first mapping relationship table, a target CDN node back-to-source relationship corresponding to the target domain name.

Optionally, if the target domain name cannot be found in the first mapping relationship table, the back-to-source relationship management server is further configured for:

using a preset CDN node back-to-source relationship as a target CDN node back-to-source relationship corresponding to the target domain name.

As shown in FIG. 8, the back-to-source relationship management server 801 may edit a topology, that is, it may edit the CDN node back-to-source relationship stored by itself to obtain the adjusted CDN node back-to-source relationship, and may store the adjusted CDN node back-to-source relationship. In addition, after obtaining the adjusted CDN node back-to-source relationship, the adjusted CDN node back-to-source relationship may be actively sent to the cache management server 802. Of course, after receiving an acquisition request from the cache management server 802, the adjusted CDN node back-to-source relationship may also be sent to the cache management server 802, which is reasonable. In addition, after receiving the adjusted CDN node back-to-source relationship, the cache management server 802 may generate a refresh instruction or a back-to-source configuration file based on the adjusted CDN node back-to-source relationship, and then send the refresh instruction or the back-to-source configuration file to a corresponding CDN node.

In the embodiment of the present disclosure, when the target CDN node back-to-source relationship stored in the back-to-source relationship management server needs to be adjusted, the back-to-source relationship management server can obtain the target domain name corresponding to the target CDN node back-to-source relationship. Then, the target CDN node back-to-source relationship corresponding to the target domain name is found by using the first mapping relationship table stored in the target domain name and the back-to-source relationship management server, Wherein, the first mapping relationship table is configured for correspondingly storing the domain name and the CDN node back-to-source relationship. Then, the back-to-source relationship management server may adjust the target CDN node back-to-source relationship according to the obtained adjustment information for the target CDN node back-to-source relationship to obtain the adjusted target CDN node back-to-source relationship. Furthermore, the target domain name and the adjusted target CDN node back-to-source relationship may be synchronized to the cache management server.

The cache management server may receive the target domain name and the adjusted target CDN node back-to-source relationship sent by the back-to-source relationship management server. Then, the cache management server can find the target CDN node back-to-source relationship corresponding to the target domain name stored in the cache management server according to the target domain name, and use the adjusted target CDN node back-source relationship to update the target CDN node back-to-source relationship and obtain a new CDN node back-to-source relationship corresponding to the target domain name. In this way, a technician does not need to manually modify the CDN node back-to-source relationship corresponding to each domain name stored in the cache management server, thereby reducing maintenance cost and error rate of the CDN node back-to-source relationship, and improving maintenance efficiency.

Optionally, the cache management server may include a back-to-source configuration file delivery server and/or a content refresh server;

when the cache management server is a back-to-source configuration file delivery server, the back-to-source configuration file delivery server is further configured for:

generating, based on the new CDN node back-to-source relationship, back-to-source configuration files for CDN nodes in the new CDN node back-to-source relationship, and delivering the generated back-to-source configuration files to corresponding CDN nodes;

when the cache management server is a content refresh server, the content refresh server is further configured for: generating, based on the new CDN node back-to-source relationship, refresh instructions for CDN nodes in the new CDN node back-to-source relationship, and delivering the generated refresh instructions to corresponding CDN nodes.

Optionally, the back-to-source relationship management server is further configured for obtaining a target domain name corresponding to the target CDN node back-to-source relationship to be adjusted and adjustment information for the target CDN node back-to-source relationship by:

receiving the target domain name corresponding to the target CDN node back-to-source relationship to be adjusted;

determining, based on the first mapping relationship table, a target CDN node back-to-source relationship corresponding to the target domain name;

sending information determined from the target CDN node back-to-source relationship to a user terminal, so that the user terminal obtains and displays a topology structure diagram corresponding to the target CDN node back-to-source relationship based on the information;

receiving and using adjustment information for the topology structure diagram sent by the user terminal as adjustment information for the target CDN node back-to-source relationship.

Optionally, the adjustment information for the topology structure diagram may include at least one of the following information:

operation information for adding CDN nodes in the topology structure diagram;

operation information for deleting CDN nodes in the topology structure diagram;

operation information for modifying CDN nodes in the topology structure diagram;

operation information for modifying a connection relationship between CDN nodes.

Optionally, the back-to-source relationship management server is further configured for determining, based on the first mapping relationship table, a target CDN node back-to-source relationship corresponding to the target domain name by:

determining whether the target domain name can be found in the first mapping relationship table;

if the target domain name can be found in the first mapping relationship table, finding, in the first mapping relationship table, a target CDN node back-to-source relationship corresponding to the target domain name.

Optionally, if the target domain name cannot be found in the first mapping relationship table, the back-to-source relationship management server is further configured for:

using a preset CDN node back-to-source relationship as a target CDN node back-to-source relationship corresponding to the target domain name.

Wherein, since the system embodiment is basically similar to the method embodiment provided from the perspective of the back-to-source relationship management server and the cache management server, the description is relatively simple. For the related part, refer to the part of the method embodiment provided from the perspective of the back-to-source relationship management server and the cache management server.

Corresponding to the embodiment of the back-to-source relationship management method provided from the perspective of the back-source relationship management server, the embodiment of the present disclosure further provides a storage medium. The storage medium is a storage medium in a back-to-source relationship management server, the back-to-source relationship management server is a server in a back-to-source relationship management system, and the back-to-source relationship management system further includes a cache management server, and the cache management server is configured for caching a mapping relationship between the domain name and the CDN node back-to-source relationship; the storage medium stores a computer program, which implements method steps of any one of embodiments of the back-to-source relationship management method provided from the perspective of the back-to-source relationship management server.

It can be understood that, in the embodiment of the present disclosure, when the target CDN node back-to-source relationship stored in the back-to-source relationship management server needs to be adjusted, the back-to-source relationship management server can obtain the target domain name corresponding to the target CDN node back-to-source relationship. Then, the target CDN node back-to-source relationship corresponding to the target domain name is found by using the first mapping relationship table stored in the target domain name and the back-to-source relationship management server, Wherein, the first mapping relationship table is configured for correspondingly storing the domain name and the CDN node back-to-source relationship. Then, the back-to-source relationship management server may adjust the target CDN node back-to-source relationship according to the obtained adjustment information for the target CDN node back-to-source relationship to obtain the adjusted target CDN node back-to-source relationship. Furthermore, the target domain name and the adjusted target CDN node back-to-source relationship may be synchronized to the cache management server. In this way, a technician does not need to manually modify the CDN node back-to-source relationship corresponding to each domain name stored in the cache management server, thereby reducing maintenance cost and error rate of the CDN node back-to-source relationship, and improving maintenance efficiency.

Corresponding to the embodiments of the back-to-source relationship management method provided from the perspective of the cache management server, an embodiment of the present disclosure further provides a storage medium, which is a storage medium in a cache management server, the cache management server is a server in a back-to-source relationship management system, and the back-to-source relationship management system further includes a back-to-source relationship management server; the storage medium stores a computer program, which implements method steps of any one of embodiments of the back-to-source relationship management method provided from the perspective of the cache management server.

It can be understood that, in the embodiment of the present disclosure, when the target CDN node back-to-source relationship stored in the cache management server needs to be adjusted, the cache management server can receive the target domain name and the adjusted target CDN node back-to-source relationship sent by the back-to-source relationship management server. Then, the cache management server can find the target CDN node back-to-source relationship corresponding to the target domain name stored in the cache management server according to the target domain name, and use the adjusted target CDN node back-source relationship to update the target CDN node back-to-source relationship and obtain a new CDN node back-to-source relationship corresponding to the target domain name. In this way, a technician does not need to manually modify the CDN node back-to-source relationship corresponding to each domain name stored in the cache management server, thereby reducing maintenance cost and error rate of the CDN node back-to-source relationship, and improving maintenance efficiency.

Corresponding to the embodiment of the back-to-source relationship management method provided from the perspective of the back-source relationship management server, the embodiment of the present disclosure further provides a computer program product. The computer program product is configured for implementing method steps of any one of embodiments of the back-to-source relationship management method provided from the perspective of the back-to-source management server.

After the computer program product provided in the embodiment of the present disclosure is executed by the processor of the back-to-source relationship management server, when the target CDN node back-to-source relationship stored in the back-to-source relationship management server needs to be adjusted, the back-to-source relationship management server can obtain the target domain name corresponding to the target CDN node back-to-source relationship. Then, the target CDN node back-to-source relationship corresponding to the target domain name is found by using the first mapping relationship table stored in the target domain name and the back-to-source relationship management server, Wherein, the first mapping relationship table is configured for correspondingly storing the domain name and the CDN node back-to-source relationship. Then, the back-to-source relationship management server may adjust the target CDN node back-to-source relationship according to the obtained adjustment information for the target CDN node back-to-source relationship to obtain the adjusted target CDN node back-to-source relationship. Furthermore, the target domain name and the adjusted target CDN node back-to-source relationship may be synchronized to the cache management server. In this way, a technician does not need to manually modify the CDN node back-to-source relationship corresponding to each domain name stored in the cache management server, thereby reducing maintenance cost and error rate of the CDN node back-to-source relationship, and improving maintenance efficiency.

Corresponding to the embodiment of the back-to-source relationship management method provided from the perspective of the cache management server, the embodiment of the present disclosure further provides a computer program product. The computer program product is configured for implementing method steps of any one of embodiments of the back-to-source relationship management method provided from the perspective of the cache management server.

After the computer program product provided in the embodiment of the present disclosure is executed by the processor of the cache management server, when the target CDN node back-to-source relationship stored in the cache management server needs to be adjusted, the back-to-source relationship management server can receive the target domain name and the adjusted target CDN node back-to-source relationship sent by the back-to-source relationship management server. Then, the cache management server can find the target CDN node back-to-source relationship corresponding to the target domain name stored in the cache management server according to the target domain name, and use the adjusted target CDN node back-source relationship to update the target CDN node back-to-source relationship and obtain a new CDN node back-to-source relationship corresponding to the target domain name. In this way, a technician does not need to manually modify the CDN node back-to-source relationship corresponding to each domain name stored in the cache management server, thereby reducing maintenance cost and error rate of the CDN node back-to-source relationship, and improving maintenance efficiency.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. For embodiments of the apparatus, server, system, storage medium and computer program product, since they are similar to the embodiments of the method, the description thereof is relatively simple; the relating parts could refer to the parts of the description of embodiments of the method.

The embodiments described above are merely preferred embodiments of the present disclosure, and not intended to limit the scope of the present disclosure. Any modifications, equivalents, improvements or the like within the spirit and principle of the application should be included in the scope of the application.

INDUSTRIAL APPLICABILITY

Based on the above technical solution provided by the embodiment of the present disclosure, when the target CDN node back-to-source relationship stored in the back-to-source relationship server needs to be adjusted, the back-to-source relationship management server can obtain the target domain name corresponding to the target CDN node back-to-source relationship, and find the target CDN node back-to-source relationship corresponding to the target domain name through the first mapping relationship table stored in the target domain name and the back-to-source relationship management server. Then, the back-to-source relationship management server can adjust the target CDN node back-to-source relationship according to the obtained adjustment information for the target CDN node back-to-source relationship, to obtain the adjusted target CDN node back-to-source relationship. Furthermore, the target domain name and the adjusted target CDN node back-to-source relationship may be synchronized to the cache management server. In this way, a technician does not need to manually modify the CDN node back-to-source relationship corresponding to each domain name stored in the cache management server, thereby reducing maintenance cost and error rate of the CDN node back-to-source relationship, and improving maintenance efficiency.

What is claimed is:

1. A back-to-source relationship management system, comprising:

a back-to-source relationship management server comprising a processor, a communication interface, a memory and a communication bus, and being configured for:
  obtaining a target domain name corresponding to a target CDN node back-to-source relationship to be adjusted, and adjustment information for the target CDN node back-to-source relationship; and
  adjusting the target CDN node back-to-source relationship by using the adjustment information to obtain an adjusted target CDN node back-to-source relationship, wherein, the target CDN node back-to-source relationship is determined based on the target domain name and a first mapping relationship table, and the first mapping relationship table is configured for storing domain names and CDN node bask-to-source relationships in correspondence with each other, wherein, each CDN node back-to-source relationship corresponding to a domain name is a path from a respective CDN node back to a source station corresponding to the domain name;
  synchronizing the target domain name and the adjusted target CDN node back-to-source relationship to the cache management server; and a cache management server configured for:
  receiving the target domain name and the adjusted target CDN node back-to-source relationship sent by the back-to-source relationship management server, and
  updating a CDN node back-to-source relationship corresponding to the target domain name stored in the cache management server by using the adjusted target CDN node back-to-source relationship to obtain a new CDN node back-to-source relationship.

2. The system of claim 1, wherein the cache management server comprises a back-to-source configuration file delivery server and/or a content refresh server;
  when the cache management server is a back-to-source configuration file delivery server, the back-to-source configuration file delivery server is further configured for:
  generating, based on the new CDN node back-to-source relationship, back-to-source configuration files for CDN nodes in the new CDN node back-to-source relationship, and delivering the generated back-to-source configuration files to corresponding CDN nodes;
  when the cache management server is a content refresh server, the content refresh server is further configured for: generating, based on the new CDN node back-to-source relationship, refresh instructions for CDN nodes in the new CDN node back-to-source relationship, and delivering the generated refresh instructions to corresponding CDN nodes.

3. The system of claim 1, wherein the back-to-source relationship management server is further configured for obtaining a target domain name corresponding to the target CDN node back-to-source relationship to be adjusted and adjustment information for the target CDN node back-to-source relationship by:
  receiving the target domain name corresponding to the target CDN node back-to-source relationship to be adjusted;
  determining, based on the first mapping relationship table, a target CDN node back-to-source relationship corresponding to the target domain name;
  sending information determined from the target CDN node back-to-source relationship to a user terminal, so that the user terminal obtains and displays a topology structure diagram corresponding to the target CDN node back-to-source relationship based on the information;
  receiving and using adjustment information for the topology structure diagram sent by the user terminal as adjustment information for the target CDN node back-to-source relationship.

4. The system of claim 3, wherein the adjustment information for the topology structure diagram comprises at least one of the following information:
  operation information for adding CDN nodes in the topology structure diagram;
  operation information for deleting CDN nodes in the topology structure diagram;
  operation information for modifying CDN nodes in the topology structure diagram;
  operation information for modifying a connection relationship between CDN nodes.

5. The system of claim 3, wherein the back-to-source relationship management server is further configured for determining, based on the first mapping relationship table, a target CDN node back-to-source relationship corresponding to the target domain name by:
  determining whether the target domain name can be found in the first mapping relationship table;
  if the target domain name can be found in the first mapping relationship table, finding, in the first mapping relationship table, a target CDN node back-to-source relationship corresponding to the target domain name.

6. The system of claim 5, wherein, if the target domain name cannot be found in the first mapping relationship table, the back-to-source relationship management server is further configured for:
  using a preset CDN node back-to-source relationship as a target CDN node back-to-source relationship corresponding to the target domain name.

7. A back-to-source relationship management method, which is applied to a back-to-source relationship management server in a back-to-source relationship management system, wherein the back-to-source relationship management system further comprises a cache management server, the cache management server is configured for caching a mapping relationship between a domain name and a CDN node back-to-source relationship, the method comprising
  obtaining a target domain name corresponding to a target CDN node back-to-source relationship to be adjusted, and adjustment information for the target CDN node back-to-source relationship;
  adjusting the target CDN node back-to-source relationship by using the adjustment information to obtain an adjusted target CDN node back-to-source relationship; wherein, the target CDN node back-to-source relationship is determined based on the target domain name and a first mapping relationship table, and the first mapping relationship table is configured for storing domain names and CDN node back-to-source relationships in correspondence with each other, wherein, each CDN node back-to-source relationship corresponding to a domain name is a path from a respective CDN node back to a source station corresponding to the domain name:
  synchronizing the target domain name and the adjusted target CDN node back-to-source relationship to the cache management server.

8. The method of claim 7, wherein obtaining a target domain name corresponding to a target CDN node back-to-source relationship to be adjusted and adjustment information for the target CDN node back-to-source relationship comprises:

receiving the target domain name corresponding to the target CDN node back-to-source relationship to be adjusted;

determining, based on the first mapping relationship table, a target CDN node back-to-source relationship corresponding to the target domain name;

sending information determined from the target CDN node back-to-source relationship to a user terminal, so that the user terminal obtains and displays a topology structure diagram corresponding to the target CDN node back-to-source relationship based on the information;

receiving and using adjustment information for the topology structure diagram sent by the user terminal as adjustment information for the target CDN node back-to-source relationship.

9. The method of claim 8, wherein the adjustment information for the topology structure diagram comprises at least one of the following information:

operation information for adding CDN nodes in the topology structure diagram;

operation information for deleting CDN nodes in the topology structure diagram;

operation information for modifying CDN nodes in the topology structure diagram;

operation information for modifying a connection relationship between CDN nodes.

10. The method of claim 8, wherein determining, based on the first mapping relationship table, a target CDN node back-to-source relationship corresponding to the target domain name comprises:

determining whether the target domain name can be found in the first mapping relationship table;

if the target domain name can be found in the first mapping relationship table, finding, in the first mapping relationship table, a target CDN node back-to-source relationship corresponding to the target domain name.

11. The method of claim 10, wherein, if the target domain name cannot be found in the first mapping relationship table, the method further comprises:

using a preset CDN node back-to-source relationship as a target CDN node back-to-source relationship corresponding to the target domain name.

12. A back-to-source relationship management method, which is applied to a cache management server in a back-to-source relationship management system, wherein the back-to-source relationship management system further comprises a back-to-source relationship management server, the method comprises:

receiving a target domain name and an adjusted target CDN node back-to-source relationship sent by the back-to-source relationship management server;

updating the CDN node back-to-source relationship corresponding to the target domain name stored in the cache management server by using the adjusted target CDN node back-to-source relationship to obtain a new CDN node back-to-source relationship, wherein, each CDN node back-to-source relationship corresponding to a domain name is a path from a respective CDN node back to a source station corresponding to the domain name.

13. The method of claim 12, wherein the cache management server comprises a back-to-source configuration file delivery server and/or a content refresh server; the method further comprises:

when the cache management server is the back-to-source configuration file delivery server, generating, based on the new CDN node back-to-source relationship, back-to-source configuration files for CDN nodes in the new CDN node back-to-source relationship, and delivering the generated back-to-source configuration files to corresponding CDN nodes;

when the cache management server is the content refresh server, generating, based on the new CDN node back-to-source relationship, refresh instructions for CDN nodes in the new CDN node back-to-source relationship, and delivering the generated refresh instructions to corresponding CDN nodes.

14. A back-to-source relationship management apparatus, operating as a back-to-source relationship management server in a back-to-source relationship management system, wherein the back-to-source relationship management system further comprises a cache management server configured for caching a mapping relationship between a domain name and a CDN node back-to-source relationship, the apparatus comprising a processor, a communication interface, a memory and a communication bus, wherein the processor, the communication interface, and the memory communicate with each other via the communication bus, the memory is configured for storing a computer program, and the processor is configured for:

obtaining a target domain name corresponding to a target CDN node back-to-source relationship to be adjusted, and adjustment information for the target CDN node back-to-source relationship;

adjusting the target CDN node back-to-source relationship by using the adjustment information to obtain an adjusted target CDN node back-to-source relationship; wherein, the target CDN node back-to-source relationship is determined based on the target domain name and a first mapping relationship table, and the first mapping relationship table is configured for storing domain names and CDN node back-to-source relationships in correspondence with each other, wherein, each CDN node back-to-source relationship corresponding to a domain name is a path from a CDN respective node back to a source station corresponding to the domain name;

synchronizing the target domain name and the adjusted target CDN node back-to-source relationship to the cache management server.

15. A back-to-source relationship management apparatus, operating as a cache management server in a back-to-source relationship management system, wherein the back-to-source relationship management system further comprises a back-to-source relationship management server, the apparatus comprising a processor, a communication interface, a memory and a communication bus, wherein the processor, the communication interface, and the memory communicate with each other via the communication bus, the memory is configured for storing a computer program, the processor is configured for:

receiving a target domain name and an adjusted target CDN node back-to-source relationship sent by the back-to-source relationship management server; and updating the CDN node back-to-source relationship corresponding to the target domain name stored in the cache management server by using the adjusted target CDN node back-to-source relationship to obtain a new CDN node back-to-source relationship, wherein each CDN node back-to-source relationship corresponding to a domain name is a path from a respective CDN node back to a source station corresponding to the domain name.

16. A back-to-source relationship management server, wherein the back-to-source relationship management server is a server in a back-to-source relationship management system, the back-to-source relationship management system further comprises a cache management server, the cache management server is configured for caching a mapping relationship between a domain name and a CDN node back-to-source relationship; the back-to-source relationship management server comprises a processor, a communication interface, a memory and a communication bus, wherein the processor, the communication interface, and the memory communicate with each other via the communication bus;

the memory is configured for storing a computer program;
the processor is configured for performing the method of claim 7 when executing the program stored on the memory.

17. A cache management server, wherein the cache management server is a server in a back-to-source relationship management system, the back-to-source relationship management system further comprises a back-to-source relationship management server; the back-to-source relationship management server comprises a processor, a communication interface, a memory and a communication bus, wherein the processor, the communication interface, and the memory communicate with each other via the communication bus;

the memory is configured for storing a computer program;
the processor is configured for performing the method of claim 12 when executing the program stored on the memory.

18. A non-transitory computer readable storage medium, which is a storage medium in a back-to-source relationship management server, wherein the back-to-source relationship management server is a server in a back-to-source relationship management system, and the back-to-source relationship management system further comprises a cache management server, and the cache management server is configured for caching a mapping relationship between a domain name and a CDN node back-to-source relationship; the storage medium stores a computer program, which is executed by a processor to implement method of claim 7 when the computer program.

19. A non-transitory computer readable, which is a storage medium in a cache management server, wherein the cache management server is a server in a back-to-source relationship management system, and the back-to-source relationship management system further comprises a back-to-source relationship management server; the storage medium stores a computer program, which is executed by a processor to implement a method of claim 12 when the computer program is executed by a processor.

* * * * *